United States Patent
Hassan (10) Patent No.: US 10,452,539 B2
(45) Date of Patent: Oct. 22, 2019

(54) SIMULATOR FOR ENTERPRISE-SCALE SIMULATIONS ON HYBRID MAIN MEMORY SYSTEMS

(71) Applicant: SAP SE, Walldorf (DE)

(72) Inventor: Ahmad Hassan, Belfast (IE)

(73) Assignee: SAP SE, Walldorf (DE)

( * ) Notice: Subject to any disclaimer, the term of this patent is extended or adjusted under 35 U.S.C. 154(b) by 97 days.

(21) Appl. No.: 15/213,930

(22) Filed: Jul. 19, 2016

(65) Prior Publication Data

US 2018/0024755 A1 Jan. 25, 2018

(51) Int. Cl.
G06F 12/00 (2006.01)
G06F 13/00 (2006.01)
G06F 12/06 (2006.01)
G06F 11/36 (2006.01)

(52) U.S. Cl.
CPC .......... *G06F 12/0623* (2013.01); *G06F 11/36* (2013.01); *G06F 2212/217* (2013.01)

(58) Field of Classification Search
CPC ..... G06F 3/0616; G06F 3/0664; G06F 3/0685
USPC ........................................................ 711/112
See application file for complete search history.

(56) References Cited

U.S. PATENT DOCUMENTS

| | | | |
|---|---|---|---|
| 5,845,325 A * | 12/1998 | Loo | G06F 12/0842 711/135 |
| 6,157,955 A | 12/2000 | Narad et al. | |
| 6,195,731 B1 | 2/2001 | Bordaz et al. | |
| 6,760,721 B1 | 7/2004 | Chasen | |
| 6,952,664 B1 | 10/2005 | Lahiri et al. | |
| 7,181,578 B1 * | 2/2007 | Guha | G06F 3/0607 711/154 |
| 7,360,073 B1 * | 4/2008 | Billstrom | G06F 21/575 713/1 |
| 7,434,002 B1 * | 10/2008 | Zedlewski | G06F 11/3409 711/130 |
| 7,624,381 B1 | 11/2009 | Czajkowski et al. | |
| 7,774,556 B2 | 8/2010 | Karamcheti et al. | |
| 7,840,397 B2 * | 11/2010 | Chiou | G06F 17/5022 703/20 |
| 7,958,329 B2 | 6/2011 | Holt | |

(Continued)

OTHER PUBLICATIONS

U.S. Appl. No. 14/704,461, Ahmad Hassan, filed May 5, 2015.

(Continued)

*Primary Examiner* — Sheng Jen Tsai
(74) *Attorney, Agent, or Firm* — Fish & Richardson P.C.

(57) ABSTRACT

Implementations of the present disclosure include methods, systems, and computer-readable storage mediums for performing actions during simulation of an application interacting with a hybrid memory system, actions including providing a first range of virtual addresses corresponding to a first type of memory in the hybrid memory system, and a second range of virtual addresses corresponding to a second type of memory in the hybrid memory system, receiving a data packet that is to be stored in the hybrid memory system, determining a virtual address assigned to the data packet, the virtual address being provided in cache block metadata associated with the data packet, and storing the data packet in one of the first type of memory and the second type of memory in the hybrid memory system based on the virtual address, the first range of virtual addresses, and the second range of virtual addresses.

17 Claims, 5 Drawing Sheets

(56) References Cited

U.S. PATENT DOCUMENTS

| | | | |
|---|---|---|---|
| 8,170,859 B1* | 5/2012 | Christensson | G06F 9/4812 703/22 |
| 8,185,471 B1 | 5/2012 | Walker et al. | |
| 8,214,191 B2 | 7/2012 | Ferren et al. | |
| 8,230,395 B1 | 7/2012 | Koh et al. | |
| 8,456,905 B2 | 6/2013 | Kasorla | |
| 8,572,051 B1 | 10/2013 | Chen et al. | |
| 8,862,588 B1 | 10/2014 | Gay | |
| 8,868,537 B1 | 10/2014 | Colgrove et al. | |
| 8,874,846 B2 | 10/2014 | Franceschini | |
| 8,880,687 B1* | 11/2014 | Chandrachari | H04L 43/065 709/224 |
| 8,959,611 B1* | 2/2015 | Vincent | H04L 61/103 726/13 |
| 8,966,462 B2 | 2/2015 | Gounares et al. | |
| 9,043,530 B1 | 5/2015 | Sundaram et al. | |
| 9,304,913 B2 | 4/2016 | Dong et al. | |
| 9,348,539 B1* | 5/2016 | Saxena | G11C 5/04 |
| 9,626,327 B2 | 4/2017 | Eilert et al. | |
| 9,652,380 B2 | 5/2017 | Byun et al. | |
| 9,672,158 B2* | 6/2017 | Karamcheti | G06F 9/5016 |
| 9,712,538 B1* | 7/2017 | Vincent | H04L 61/103 |
| 9,720,925 B1 | 8/2017 | Lawson | |
| 9,720,967 B2 | 8/2017 | Lee et al. | |
| 9,740,438 B2* | 8/2017 | Hassan | G06F 3/0685 |
| 9,841,914 B2 | 12/2017 | Hassan | |
| 9,846,550 B2 | 12/2017 | Muralimanohar | |
| 1,008,318 A1 | 9/2018 | Hassan | |
| 2001/0027387 A1* | 10/2001 | Miyake | G06F 11/3636 703/22 |
| 2003/0033431 A1* | 2/2003 | Shinomiya | G06F 12/1027 709/245 |
| 2004/0184340 A1 | 9/2004 | Dwarkasdas | |
| 2005/0097078 A1 | 5/2005 | Lohman et al. | |
| 2005/0108447 A1* | 5/2005 | Thadani | G06F 12/10 710/22 |
| 2006/0059474 A1 | 3/2006 | Bhansali et al. | |
| 2006/0117299 A1 | 6/2006 | Goldsmith et al. | |
| 2007/0050328 A1 | 3/2007 | Li | |
| 2007/0050609 A1 | 3/2007 | Ferren et al. | |
| 2007/0202473 A1* | 8/2007 | Koda | G09B 19/0053 434/118 |
| 2007/0226186 A1 | 9/2007 | Ewen et al. | |
| 2008/0005476 A1 | 1/2008 | Venkatesan | |
| 2008/0034179 A1 | 2/2008 | Mewhinney et al. | |
| 2008/0109592 A1* | 5/2008 | Karamcheti | G06F 9/5016 711/103 |
| 2008/0140682 A1 | 6/2008 | Grosset et al. | |
| 2008/0288718 A1 | 11/2008 | Hepkin et al. | |
| 2008/0288742 A1 | 11/2008 | Hepkin et al. | |
| 2009/0049234 A1 | 2/2009 | Oh et al. | |
| 2009/0157952 A1 | 6/2009 | Kim et al. | |
| 2009/0157964 A1 | 6/2009 | Kasorla | |
| 2009/0182976 A1 | 7/2009 | Agesen et al. | |
| 2009/0307462 A1 | 12/2009 | Fleming et al. | |
| 2010/0010799 A1* | 1/2010 | Altrichter | G06F 11/3457 703/20 |
| 2010/0042999 A1 | 2/2010 | Dorai et al. | |
| 2010/0153631 A1 | 6/2010 | Moon et al. | |
| 2010/0169602 A1 | 7/2010 | Hulbert et al. | |
| 2010/0262633 A1 | 10/2010 | Bhattacharjee et al. | |
| 2010/0287356 A1 | 11/2010 | Cameron et al. | |
| 2010/0306591 A1 | 12/2010 | Krishna | |
| 2010/0318718 A1 | 12/2010 | Eilert et al. | |
| 2011/0066808 A1 | 3/2011 | Flynn et al. | |
| 2011/0072006 A1 | 3/2011 | Yu et al. | |
| 2011/0078340 A1 | 3/2011 | Kim et al. | |
| 2011/0093654 A1 | 4/2011 | Roberts et al. | |
| 2011/0131199 A1 | 6/2011 | Simon et al. | |
| 2011/0271264 A1 | 11/2011 | Vorbach et al. | |
| 2011/0313999 A1 | 12/2011 | Bruno et al. | |
| 2012/0072744 A1* | 3/2012 | Jain | G06F 1/3268 713/320 |
| 2012/0089595 A1 | 4/2012 | Jaecksch | |
| 2012/0124318 A1 | 5/2012 | Bivens | |
| 2012/0144092 A1 | 6/2012 | Hsieh | |
| 2012/0151127 A1 | 6/2012 | Lim | |
| 2012/0151252 A1 | 6/2012 | Harris et al. | |
| 2012/0158799 A1 | 6/2012 | Morsi et al. | |
| 2012/0246392 A1 | 9/2012 | Cheon | |
| 2012/0290768 A1 | 11/2012 | Rubowitz et al. | |
| 2013/0013860 A1 | 1/2013 | Franceschini | |
| 2013/0074092 A1 | 3/2013 | Gounares et al. | |
| 2013/0080621 A1* | 3/2013 | Jain | G06F 9/5094 709/224 |
| 2013/0081005 A1 | 3/2013 | Gounares et al. | |
| 2013/0086309 A1* | 4/2013 | Lee | G06F 12/0246 711/103 |
| 2013/0103380 A1* | 4/2013 | Brandstatter | G06F 9/45558 703/26 |
| 2013/0226903 A1 | 8/2013 | Wu et al. | |
| 2013/0246698 A1 | 9/2013 | Estan | |
| 2013/0275716 A1 | 10/2013 | Nishida | |
| 2013/0283250 A1 | 10/2013 | Eichenberger | |
| 2013/0326109 A1 | 12/2013 | Kivity | |
| 2014/0007043 A1 | 1/2014 | Aliseychik et al. | |
| 2014/0089564 A1 | 3/2014 | Liu et al. | |
| 2014/0108723 A1 | 4/2014 | Nowoczynski | |
| 2014/0188870 A1 | 7/2014 | Borthakur | |
| 2014/0280685 A1* | 9/2014 | Magenheimer | H04L 67/1097 709/213 |
| 2014/0281212 A1 | 9/2014 | Schreter et al. | |
| 2014/0281249 A1 | 9/2014 | Waldsperger | |
| 2014/0282455 A1 | 9/2014 | Felch | |
| 2014/0293801 A1 | 10/2014 | Dimou | |
| 2015/0012465 A1 | 1/2015 | Pingenot | |
| 2015/0062736 A1 | 3/2015 | Kim et al. | |
| 2015/0077426 A1 | 3/2015 | Kweon et al. | |
| 2015/0081300 A1 | 3/2015 | Kim | |
| 2015/0089604 A1 | 3/2015 | Mathew | |
| 2015/0106582 A1 | 4/2015 | Mai et al. | |
| 2015/0169226 A1 | 6/2015 | Shen et al. | |
| 2015/0199126 A1* | 7/2015 | Jayasena | G11C 11/005 711/103 |
| 2015/0206574 A1* | 7/2015 | Greathouse | G06F 13/1636 711/103 |
| 2015/0309789 A1 | 10/2015 | Thorat | |
| 2015/0363319 A1* | 12/2015 | Qi | G06F 3/0619 711/121 |
| 2015/0370560 A1 | 12/2015 | Tan | |
| 2015/0378169 A1 | 12/2015 | Naeimi | |
| 2016/0019132 A1 | 1/2016 | Vilakkunnadathil | |
| 2016/0117258 A1 | 4/2016 | Karamcheti et al. | |
| 2016/0125927 A1* | 5/2016 | Wei | G11C 11/16 365/148 |
| 2016/0150003 A1 | 5/2016 | Magdon-Ismall | |
| 2016/0179685 A1 | 6/2016 | Byun et al. | |
| 2016/0188217 A1 | 6/2016 | Golander et al. | |
| 2016/0196112 A1 | 7/2016 | Edwards et al. | |
| 2016/0196324 A1 | 7/2016 | Haviv et al. | |
| 2016/0005423 A1 | 8/2016 | Neppalli et al. | |
| 2016/0253093 A1* | 9/2016 | Zhang | G06F 12/08 710/308 |
| 2016/0321048 A1 | 11/2016 | Matsuura | |
| 2016/0328169 A1* | 11/2016 | Hassan | G06F 3/0625 |
| 2016/0336069 A1* | 11/2016 | Lin | G11C 11/5657 |
| 2016/0378169 A1* | 12/2016 | Naeimi | G06F 1/3275 713/323 |
| 2016/0378829 A1 | 12/2016 | Vengerov et al. | |
| 2016/0378977 A1* | 12/2016 | Alme | G06F 21/53 726/23 |
| 2017/0010817 A1 | 1/2017 | Lim | |
| 2017/0052741 A1* | 2/2017 | Hassan | G06F 3/0685 |
| 2017/0052742 A1 | 2/2017 | Hassan | |
| 2017/0060740 A1* | 3/2017 | Doerner | G06F 12/0804 |
| 2017/0090776 A1 | 3/2017 | Kowles | |
| 2017/0091334 A1 | 3/2017 | Kabiljo et al. | |
| 2017/0115892 A1 | 4/2017 | Gokita | |
| 2017/0116210 A1 | 4/2017 | Park et al. | |
| 2017/0147516 A1 | 5/2017 | De | |
| 2017/0154136 A1* | 6/2017 | Eckmann | G06F 9/455 |
| 2017/0160955 A1* | 6/2017 | Jayasena | G11C 11/005 |

(56) References Cited

U.S. PATENT DOCUMENTS

| | | | |
|---|---|---|---|
| 2017/0161198 A1* | 6/2017 | Trika | G06F 11/1441 |
| 2017/0193136 A1 | 7/2017 | Prasad et al. | |
| 2017/0206010 A1* | 7/2017 | Nachimuthu | G06F 1/3275 |
| 2017/0206172 A1* | 7/2017 | Ma | G11C 7/1006 |
| 2017/0212843 A1 | 7/2017 | Agesen et al. | |
| 2017/0220256 A1* | 8/2017 | Balasubramonian | G06F 12/0238 |
| 2017/0220257 A1* | 8/2017 | Balasubramonian | G06F 11/1012 |
| 2017/0220488 A1* | 8/2017 | Balasubramonian | H03M 7/30 |
| 2017/0220516 A1 | 8/2017 | Eilert et al. | |
| 2017/0223046 A1* | 8/2017 | Singh | H04L 43/062 |
| 2017/0242595 A1* | 8/2017 | Niu | G06F 3/0613 |
| 2017/0289000 A1 | 10/2017 | Park et al. | |
| 2017/0301386 A1 | 10/2017 | Parks et al. | |
| 2017/0352012 A1 | 12/2017 | Hearn et al. | |
| 2018/0024750 A1 | 1/2018 | Hassan | |
| 2018/0024754 A1 | 1/2018 | Hassan | |
| 2018/0024821 A1 | 1/2018 | Hassan | |
| 2018/0024913 A1 | 1/2018 | Hassan | |
| 2018/0024922 A1 | 1/2018 | Hassan | |
| 2018/0024923 A1 | 1/2018 | Hassan | |
| 2018/0024928 A1 | 1/2018 | Hassan | |
| 2018/0024997 A1 | 1/2018 | Hassan | |
| 2018/0025016 A1 | 1/2018 | Hassan | |
| 2018/0025055 A1 | 1/2018 | Hassan | |
| 2018/0025904 A1 | 1/2018 | Hassan | |
| 2019/0057131 A1 | 2/2019 | Hassan | |

OTHER PUBLICATIONS

U.S. Appl. No. 14/831,567, Amhad Hassan, filed Aug. 20, 2015.
U.S. Appl. No. 14/831,624, Ahmad Hassan, filed Aug. 20, 2015.
U.S. Appl. No. 15/677,700, Hassan, filed Aug. 15, 2017.
Dhiman et al., "PDRAM a hybrid PRAM and DRAM main memory system," Proceedings of the 46th Annual Design Automation Conference, Jul. 26-31, 2009, pp. 664-669.
Hassan et al., "Analytical models and techniques for Software-Managed Energy-Efficient Hybrid DRAM/NVM Main Memory," AMC International Conference on Computing Frontiers 2015, May 18-21, 2015.
Hassan et al., "Energy-Efficient In-Memory Data Stores on Hybrid Memory Hierarchies," Eleventh International Workshop on Dada Management on New Hardware, Jun. 2015, last retrieved from https //event.cwi.nl/damon2015/slides/slides-hassan.pdf on Jan. 5, 2018.
Hu et al., "Data allocation optimization for hybrid scratch pad memory with sram and nonvolatile memory," IEEE Transactions on Very Large Scale Integration (VLSI) Systems, Jun. 2013, 21(6) 1094-1102.
Li et al., "Assert(!Defined(Sequential I/O))," Proceedings of the 6th USENIX Conference on Hot Topics in Storage and File Systems, Jun. 17-18, 2014, 1-5.
Luk et al., "Pin Building Customized Program Analysis Tools with Dynamic Instrumentation," ACM Sigplan Notices, Jun. 2005, 40(6) 190-200.
Mogul et al., "Operating system support for NVM+DRAM hybrid main memory," Proceedings of teh 12th Conference on Hot Topics in Operating Systems, May 18-20, 2009, 1-5.
Ramos et al., "Page placement in hybrid memory systems," Proceedings of the International Conference on Supercomputing, May 31-Jun. 4, 2011.
U.S. Office Action in related U.S. Appl. No. 15/213,621 dated Dec. 13, 2018, 12 pages.
U.S. Office Action in related U.S. Appl. No. 15/213,621 dated May 17, 2018, 11 pages.
U.S. Office Action in related U.S. Appl. No. 15/213,654 dated Dec. 1, 2017, 21 pages.
U.S. Office Action in related U.S. Appl. No. 15/213,654 dated Jul. 2, 2018, 41 pages.
U.S. Office Action in related U.S. Appl. No. 15/213,654 dated Mar. 16, 2018, 31 pages.
U.S. Office Action in related U.S. Appl. No. 15/213,654 dated Nov. 27, 2018, 7 pages.
U.S. Office Action in related U.S. Appl. No. 15/213,754 dated Feb. 27, 2018, 23 pages.
U.S. Office Action in related U.S. Appl. No. 15/213,754 dated Jun. 20, 2018, 22 pages.
U.S. Office Action in related U.S. Appl. No. 15/213,754 dated Sep. 11, 2018, 22 pages.
U.S. Office Action in related U.S. Appl. No. 15/213,816 dated Jul. 26, 2018, 27 pages.
U.S. Office Action in related U.S. Appl. No. 15/213,960 dated Dec. 13, 2018, 22 pages.
U.S. Office Action in related U.S. Appl. No. 15/213,960 dated Jan. 11, 2018, 22 pages.
U.S. Office Action in related U.S. Appl. No. 15/213,960 dated Jul. 12, 2018, 24 pages.
U.S. Office Action in related U.S. Appl. No. 15/214,019 dated Aug. 27, 2018, 8 pages.
U.S. Office Action in related U.S. Appl. No. 15/214,019 dated Dec. 22, 2017, 12 pages.
U.S. Office Action in related U.S. Appl. No. 15/214,019 dated Jun. 14, 2018, 10 pages.
U.S. Office Action in related U.S. Appl. No. 15/214,082 dated Aug. 27, 2018, 27 pages.
U.S. Office Action in related U.S. Appl. No. 15/214,102 dated Jul. 24, 2018, 33 pages.
Wang et al., "Optimizated Allocation of Data Variables to PCM/DRAM-based Hybrid Main Memory for Real-Time Embedded Systems," Embedded Systems Letters, IEEE, Sep. 2014, 6(3) 61-64.
U.S. Office Action in related U.S. Appl. No. 15/213,754 dated Jan. 29, 2019, 29 pages.
U.S. Office Action in related U.S. Appl. No. 15/213,816 dated Feb. 7, 2019, 27 pages.
U.S. Office Action in related U.S. Appl. No. 15/214,102 dated Feb. 6, 2019, 34 pages.
Zakai, "Emscripten: An LLVM-to-JavaScript Compiler," Proceedings of the ACM international conference companion on Object oriented programming systems languages and applications companion (OOPSLA), Portland, Oregon, Oct. 22-27, 2011, 12 pages.
U.S. Office Action in related U.S. Appl. No. 15/214,082 on Mar. 8, 2019, 41 pages.
U.S. Office Action in related U.S. Appl. No. 15/213,626 dated Apr. 12, 2019, 23 pages.
U.S Office Action in related U.S. Appl. No. 15/213,674 dated Apr. 12, 2019, 27 pages.
U.S. Office Action in related U.S. Appl. No. 15/213,754 dated May 23, 2019, 32 pages.
Chen et al., "FSRAM: Flexible Sequential and Random Access Memory for Embedded Systems" Laboratory for Advanced Research in Computing Technology and Compilers Technical Report No. ARCTiC, Mar. 1, 2004, 6 pages.
Dulloor et at, "Data tiering in heterogeneous memory systems" Proceedings of the Eleventh European Conference on Computer Systems, ACM, Apr. 18, 2016, 16 pages.
Ouyang et al., "SSD-Assisted Hybrid Memory to Accelerate Menncached over High Performance Networks" 2012 41st International Conference on Parallel Processing, IEEE, Sep. 10, 2012, 10 pages.
U.S. Office Action in related U.S. Appl. No. 15/213,816 dated Jun. 18, 2019, 46 pages.
Nang et al., "NVMalloc: Exposing an Aggregate SSD Store as a Memory Partition in Extreme-Scale Machines" 2012 IEEE 26th International Parallel and Distributed Processing Symposium, May 21, 2012, 12 pages.

\* cited by examiner

SIMULATOR FOR ENTERPRISE-SCALE SIMULATIONS ON HYBRID MAIN MEMORY SYSTEMS

BACKGROUND

A business or other type of enterprise may operate enterprise systems to provide software functionality to customers and employees. An enterprise system may include back-end enterprise servers that host enterprise applications such as enterprise resource planning (ERP) systems, client-relationship management (CRM) systems, product lifecycle management (PLM) systems, supply chain management (SCM) systems, supplier relationship management (SRM) systems, and so forth. During the execution of an enterprise application, application data may be placed in or accessed from the main memory of the enterprise server, such that the application data is immediately accessible by processors of the enterprise server.

Increasingly, large amounts of application data are stored in the main memory of enterprise servers. Main memory may include dynamic random access memory (DRAM), which consumes a relatively high amount of static energy both in active and idle states due to continuous leakage and refresh power. Various byte-addressable non-volatile memory (NVM) technologies promise near-zero static energy and persistence. However, NVM may exhibit high latency and high dynamic energy relative to DRAM.

SUMMARY

Implementations of the present disclosure include computer-implemented methods for enterprise-scale simulations in hybrid memory systems. In some implementations, methods include performing actions during simulation of an application interacting with a hybrid memory system, actions including providing a first range of virtual addresses corresponding to a first type of memory in the hybrid memory system, and a second range of virtual addresses corresponding to a second type of memory in the hybrid memory system, receiving a data packet that is to be stored in the hybrid memory system, determining a virtual address assigned to the data packet, the virtual address being provided in cache block metadata associated with the data packet, and storing the data packet in one of the first type of memory and the second type of memory in the hybrid memory system based on the virtual address, the first range of virtual addresses, and the second range of virtual addresses.

These and other implementations may each optionally include one or more of the following features: the first range of virtual addresses and the second range of virtual addresses are provided through invocation of a system call that informs memory controllers of the starting virtual address ending virtual address for the first type of memory, and the starting virtual address and ending virtual address for the second type of memory; the system call is invoked at execution of the application; the virtual address is recorded in the cache block metadata when the data packet is stored in a cache; the cache includes a multi-level cache and the virtual address is recorded in the cache block metadata when the data packet is stored in a first cache level of the cache; the virtual address is added to the data packet in response to the data packet exiting the cache; and the first type of memory includes dynamic random access memory (DRAM), and the second type of memory includes non-volatile memory (NVM).

The present disclosure also provides one or more non-transitory computer-readable storage media coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure may include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to enterprise-scale simulations in hybrid memory systems. Some implementations include performing actions during simulation of an application interacting with a hybrid memory system, actions including providing a first range of virtual addresses corresponding to a first type of memory in the hybrid memory system, and a second range of virtual addresses corresponding to a second type of memory in the hybrid memory system, receiving a data packet that is to be stored in the hybrid memory system, determining a virtual address assigned to the data packet, the virtual address being provided in cache block metadata associated with the data packet, and storing the data packet in one of the first type of memory and the second type of memory in the hybrid memory system based on the virtual address, the first range of virtual addresses, and the second range of virtual addresses.

To provide context for implementations of the present disclosure, real-time data analytics aim at making knowledge available with sub-second and often sub-millisecond response time. For example, real-time enterprise resource planning (ERP) systems enable enterprises to view every change in the enterprise as soon as it happens, and can be a driver in the success of the enterprise. In some examples, real-time access to information helps in gaining competitive advantage through efficient and improved (e.g., more informed) decision making, product pricing, risk management, product life-cycle, customer feedback, customer engagement, brand development, product pricing, and reduced total cost of ownership (TCO). The growing volumes of enterprise data makes it challenging to achieve the target response times in real-time data analytics.

The advances in multi-core processing, caching and less expensive main memory has brought a major breakthrough in designing real-time enterprise systems. In-memory databases open doors for real-time analytics as it uses faster main-memory as a primary storage, and bypasses I/O disk delays in analytical data processing. Improvements in both hardware and in-memory databases have triggered the unification of both operational and analytical storage models together in a unified in-memory data store. For example, slower, disk-based memory is only required for persistent storage. This has a negligible impact on the throughput of in-memory databases, because persistence is moved from the critical path. Accordingly, in-memory databases enable real-time data analytics on unified data with minimal response times, because the data resides in main memory, which is an order of magnitude faster for accessing than traditional, disk-based memory.

With regard to types of memory used for main memory systems, non-volatile memory (NVM) that provides persistence (like a traditional hard disk), and byte-addressability (like conventional DRAM) is termed as storage class memory (SCM). Examples SCMs include phase change memory (PCM), spin transfer torque memory (STT-RAM), and memristors. DRAM uses capacitance to store electric charge, which requires continuous power due to leakage. NVM uses resistance, rather than capacitance, for bit representation. Both DRAM and NVM consume static energy and dynamic energy. Static energy is consumed at all times when the memory system is switched on, and is independent of any memory accesses. Dynamic energy is an energy that is consumed by an actual read or a write operation (memory accesses). Static energy is further divided into cell leakage energy, and refresh energy. NVM is superior to DRAM with respect to static energy consumption, because NVM has low leakage energy, and does not require refresh energy. With non-negligible leakage power and relatively high refresh power, DRAM can consume 30-40% of the total server power. The DRAM size directly influences the power consumption of the servers.

NVM is more scalable than DRAM. For example, it has been shown that PCM can scale down to 10 nm, while the ability of DRAM to scale below 22 nm feature sizes is yet to be confirmed. Through NVM, such highly scalable and denser main memory storage enables building of enterprise systems with larger main memory storage capacity. However, the read or write access latency and dynamic energy of NVM are higher than DRAM. For example, the read latency and the write latency of PCM is approximately 4.4× and 12× times that of DRAM, respectively. As another example, the read dynamic energy and the write dynamic energy of PCM is approximately 2× and 43× times that of DRAM, respectively. Further, the storage cells of NVM wear with the usage.

Accordingly, the discrepancies in access latency and dynamic energy, as well as wear of NVM, pose challenges in using NVM as an alternative to DRAM. However, the scaling properties and low static energy of NVM are motivating factors in the design of energy efficient hybrid main memory systems that include both NVM and DRAM. In general, designing an energy efficient hybrid memory system typically focuses on designing a hybrid memory system that is more energy efficient than a DRAM-only memory system. Here, energy efficiency is achieved through the low static energy of NVM in comparison to DRAM. One strategy is to replace as much DRAM as possible with SCM for reducing the energy consumption of the system, with a constraint of keeping the performance degradation (which results from NVM) to a defined minimum. In order to benefit from NVM in a hybrid memory system, an application-specific, hybrid memory system should be designed with appropriate sizes of NVM and DRAM.

Implementations of the present disclosure are applicable to hybrid main memory systems, including DRAM and NVM, to support the operations of one or more applications executing in an enterprise environments, or any other appropriate computing environment. For example, application(s) may employ an in-memory database to enable access to the database with lower latency than may be exhibited when accessing a database stored in a disk storage device.

Figure 1:
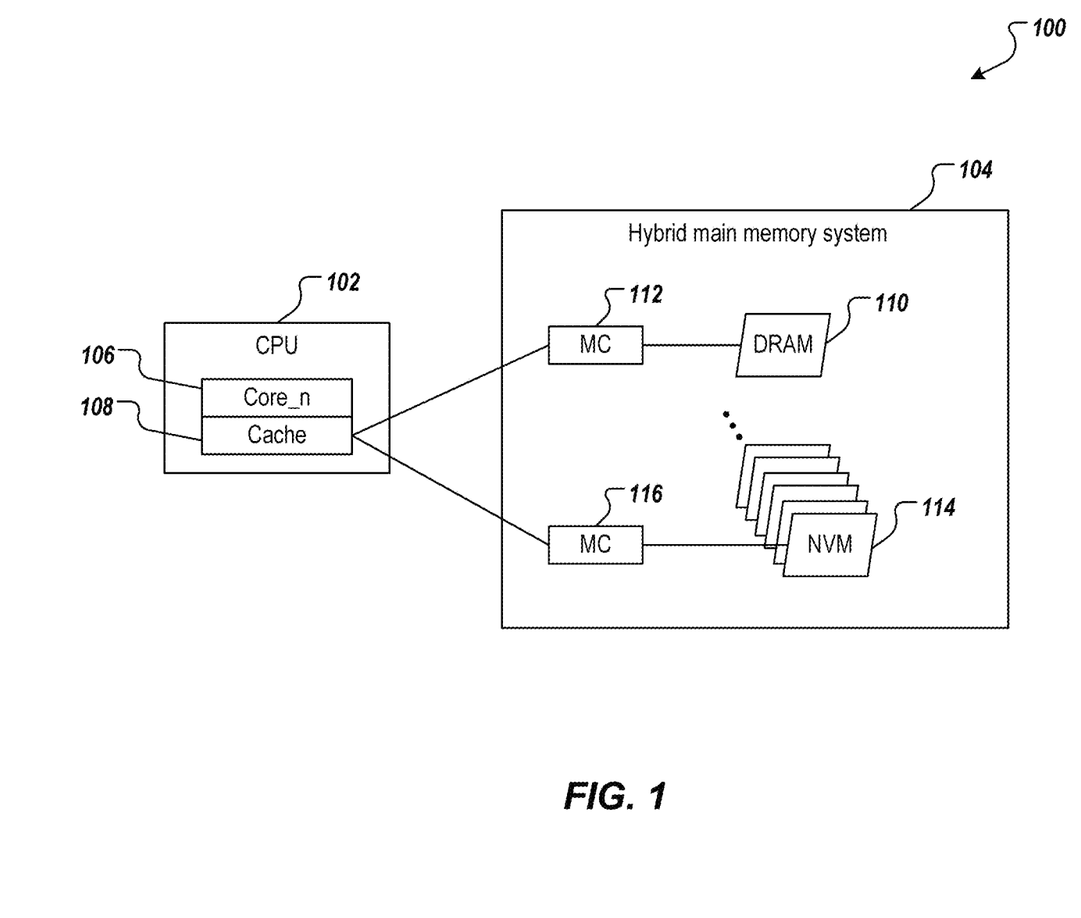
FIG. 1 depicts an example memory architecture in accordance with implementations such as those of the present disclosure.

FIG. 1 depicts an example memory architecture 100 that may be implemented within an enterprise server or other type of computing device(s). In the example of FIG. 1, the example memory architecture 100 includes a central processing unit (CPU) 102 and a hybrid main memory system 104. The CPU 102 includes a core 106 having a respective cache 108. Although a single core 106 and respective cache 108 is depicted, it is appreciated that the CPU 102 may include multiple cores 106, each with a respective cache 108. Further, although a single CPU 102 is depicted, it is appreciated that computing device(s) may include multiple CPUs 102. The main memory system 104 includes DRAM 110 with a respective memory controller (MC) 112, and NVM 114 with a respective MC 116. In some cases, a cache 108 accesses (e.g., reads, writes, deletes, etc.) data in the DRAM 110 through the MC 112, and accesses data in the NVM 114 through the MC 116. The hybrid main memory system 104 may include any number of instances, or cells, of DRAM and NVM, to provide any amount of memory for use by the CPU(s) 102.

In some examples, the example memory architecture 100 may support an in-memory database that uses main memory for data storage. Main memory may include one or more types of memory (e.g., DRAM, NVM) that communicates with one or more processors, e.g., CPU(s), over a memory bus. An in-memory database system may be contrasted with database management systems that employ a disk storage mechanism. In some examples, in-memory database systems may be faster than disk storage databases, because internal optimization algorithms may be simpler and execute fewer CPU instructions. In some examples, accessing data in an in-memory database system may reduce or eliminate seek time when querying the data, providing faster and more predictable performance than disk-storage databases. An in-memory database may include a row-oriented database, in which data is stored in any number of rows or records. An in-memory database may also include a column-oriented in-memory database, in which data tables are stored as sections of columns of data (rather than as rows of data). An example in-memory database system is HANA™, provided by SAP™ SE of Walldorf, Germany.

In some examples, simulators are used to model performance of different types of memory. However, and prior to implementations of the present disclosure, simulators did not provide functionality to direct heap applications (e.g., malloc, mmap) on a hybrid memory systems. This is because such simulators work on physical addressing, and applications do not have access to physical addresses. Instead, an application is only able to view virtual addresses assigned by the operating system (OS) (e.g., through malloc or mmap). Because such simulators internally work on physical addressing, it is challenging to choose the data allocation place from within the application code.

To provide further context, an example system simulator operates in two modes: 1) a system call emulation (SE) mode; and 2) a full system simulation (FS) mode. In the SE mode, the simulator does not run the complete OS, and instead implements all system calls within the simulator code. Consequently, when the application calls any system call, it is provided by the simulator. In the FS mode, the simulator actually runs the full OS (e.g., Linux). In that case, the simulator's functionality is to provide the simulated view of the hardware to the OS. The SE mode is significantly faster than the FS mode, because the SE mode does not require execution of the relatively complex OS on top of the simulator, and bears the load of the application code itself. For enterprise-scale, in-memory databases, the SE mode is the only practical solution, because databases are impractical to run on full system simulation.

An example state-of-the-art, full system simulator is the GEM5 simulator, which includes a configurable simulation framework, multiple ISAs, and diverse CPU models. However, and as with other simulators, the internal addressing of the GEM5 simulator is based on physical addresses, which are not visible to the application. On the other hand, caches and main memory controllers only see the physical address for each read and write request. Consequently, there is a mismatch between the memory address seen by the application and memory address seen by the memory controller for a single memory location on a memory device. At the application level, it is a virtual address and within the system simulator it is the physical address. Further, modern in-memory systems run writeback caches. In the writeback cache, when the packet is written back from last level cache (LLC) to the main memory, a physical address is generated from the cache TAG (a unique data identifier) and block address within the LLC. At this point, there is no way to determine the original virtual address of this data that was assigned by the OS.

Accordingly, traditional system simulators, such as GEM5, suffer from: 1) mismatch between the memory location address seen by the application and the memory controller; and 2) unavailability of the virtual address of the packet for writeback traffic from the LLC to the main memory controller.

In view of the above context, and as described in further detail herein, implementations of the present disclosure are generally directed to enterprise-scale simulations in hybrid memory systems. More particularly, implementations of the present disclosure provide a simulator, through which read and writeback traffic to main memory controllers within the simulator is redirected to DRAM or NVM based on the OS virtual addresses rather than physical addresses. In this manner, application programmers can dictate whether to allocate memory on DRAM or NVM from the application code.

To provide additional context for implementations of the present disclosure, an example memory access path is described. The example memory access path can be described as a hardware resource pipeline for a processor (e.g., a core) to access data to/from a memory architecture. In some examples, the memory architecture includes a multi-level cache having first ($L_1$), second ($L_2$), and third ($L_3$) level caches, main memory, and disk-based memory. In some examples, the first and second level caches (e.g., $L_1$ cache, $L_2$ cache, respectively) are on-chip caches, which are located on the processing core. In some examples, the third level cache (e.g., $L_3$ cache) is shared by multiple processing cores. The main memory is provided as a hybrid memory system including DRAM and NVM.

Implementations of the present disclosure provide a system call, configureVirtualRanges, which receives the parameters to configure memory controllers as input (e.g., in a system simulator). In some examples, one memory controller is provided for DRAM, and another memory controller is provided for NVM (e.g., see FIG. 1). In some examples, the parameters include the starting virtual address for DRAM and ending virtual address for DRAM, as well as the starting virtual address for NVM and ending virtual address for NVM. In some implementations, the system call configureVirtualRanges is invoked by the application as soon as the application begins executing. In some examples, the system call configureVirtualRanges instructs memory controllers that, if a read packet belongs to a DRAM virtual address range, then the data packet is to be redirected to DRAM physical memory, and if a read packet belongs to NVM virtual address range, then the data packet is to be redirected to NVM physical memory.

In accordance with implementations of the present disclosure, a data routing protocol of a traditional system simulator (e.g., GEM5) is modified. In some examples, the data routing protocol is modified to determine whether the data packet is coming from the LLC. If the data packet is coming from the LLC, the virtual address of the data packet is determined, and the virtual address ranges are queried to determine whether the virtual address is a DRAM address or a NVM address. If the virtual address does not belong to any of the pre-configured virtual address ranges, the data packet is redirected to the DRAM by default. Through implementations of the present disclosure, the physical addressing becomes irrelevant.

Implementations of the present disclosure enable application programmers (developers) to choose whatever virtual address range they prefer to choose for DRAM or NVM. In this manner, there is no need for the application programmer to configure or modify the source code of the system simulator, as the system simulator will configure itself for these new virtual address ranges upon receiving the system call configureVirtualRanges.

Figure 2:
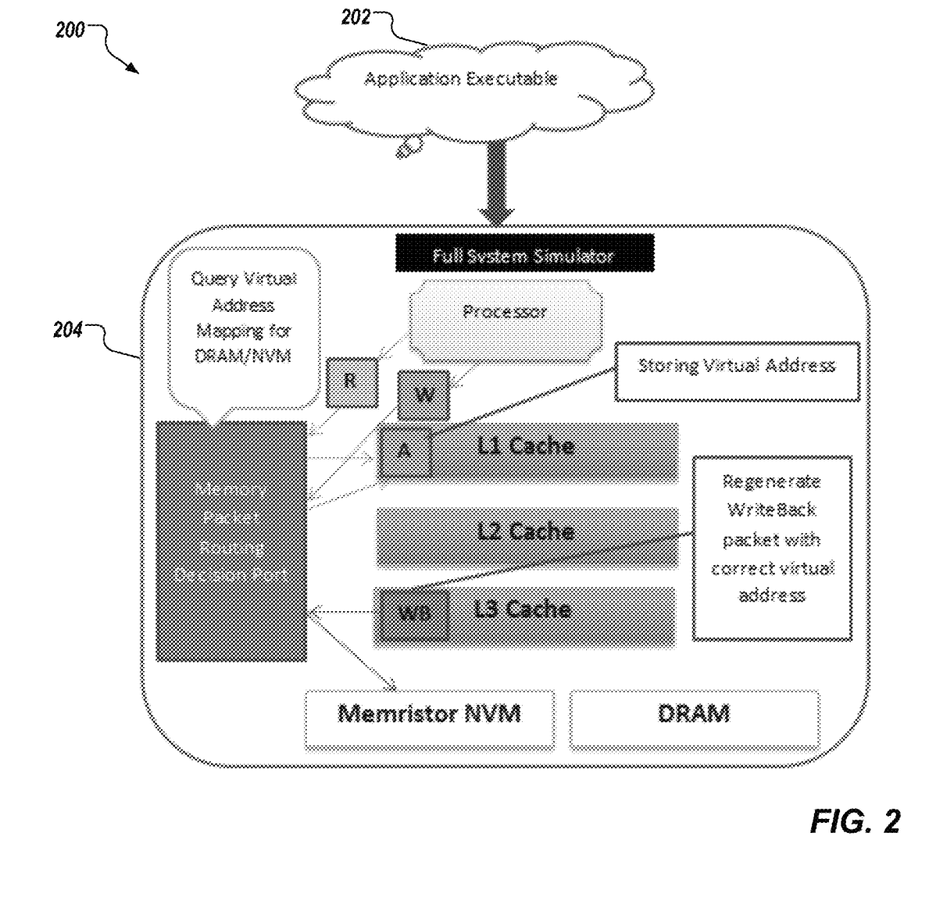
FIG. 2 depicts an example simulator architecture in accordance with implementations of the present disclosure.

FIG. 2 depicts an example simulator architecture 200 in accordance with implementations of the present disclosure. The example simulator architecture 200 includes an application 202, and a system simulator 204. In general, the example of FIG. 2 depicts how the read (R) and write (W) packets enter into the system simulator 204, and how the original virtual address (A) is preserved when it enters the $L_1$ cache. Moreover, when the writeback (WB) packet is created from the evicted cacheline, the preserved virtual address is injected into the packet. This injected virtual address is used by the memory port to route the packet to the appropriate physical memory.

In accordance with implementations of the present disclosure, the store operation from the application 202 does not necessarily cause the write operation directly on the main memory. In some examples, the write operation goes from the processor to the $L_1$ cache. The caches follow a writeback policy, in which the cache line from the $L_1$ cache goes to the $L_2$ cache, and the writeback data goes to the $L_3$ cache from the $L_2$ cache. From the $L_3$ cache, the writeback data is provided to the main memory controllers, which determine whether to send the packet to DRAM or NVM.

In some implementations, the cache block metadata is extended to include the originally assigned virtual address of the cache line. Traditional system simulators do not store the virtual addresses of the data packets in the cache lines, because the caches work on physical addresses. In accordance with implementations of the present disclosure, when a writeback packet is generated for a particular cache line, the original virtual address of the packet is determined from the cache block metadata. The original virtual address is used as the primary routing address, which is passed on to the memory controller for determining where to send the data packet.

In some implementations, the memory controllers extract the virtual address of the write packet and query the virtual address list to determine whether the write data packet belongs to DRAM or NVM. Based on the assigned virtual address range, the packet is passed onto DRAM or NVM.

Figure 3:
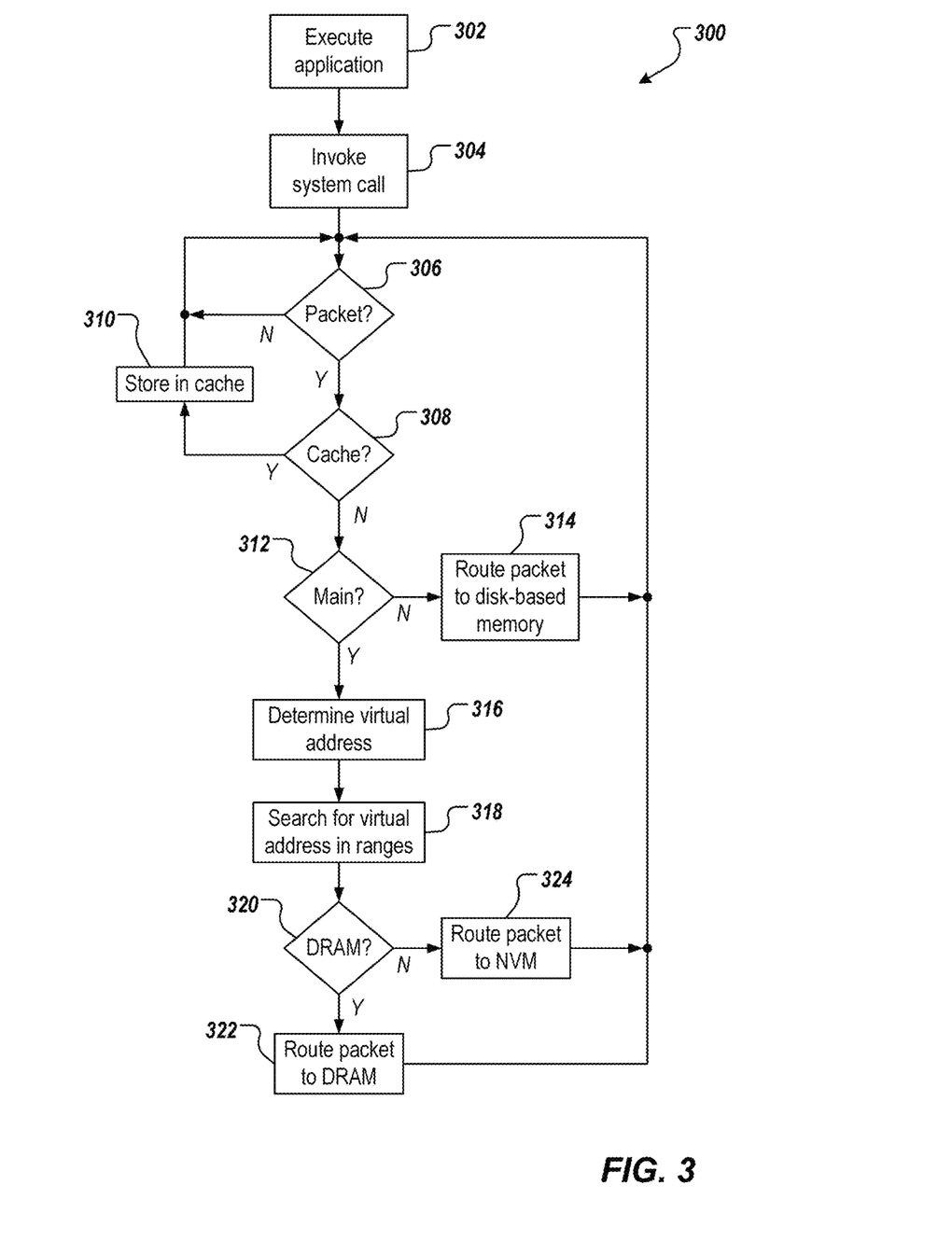
FIG. 3 depicts an example process that can be executed in accordance with implementations such as those of the present disclosure.

FIG. 3 depicts an example process 300 that can be executed in accordance with implementations of the present disclosure. In some implementations, the example process 300 may be performed using one or more computer-executable programs executed using one or more computing devices. The example process 300 of FIG. 3 can be performed to handle read packets in a system simulator (e.g., the system simulator 204 of FIG. 2).

An application is executed (302). For example, the application 202 of FIG. 2 is executed by one or more computing device to interact with the simulator system 204. The system call configureVirtualRanges is invoked (304). For example, and as described above, the system call configureVirtualRanges is invoked by the simulator system to inform the memory controllers (e.g., the DRAM memory controller and the NVM memory controller) of the starting virtual address for DRAM and ending virtual address for DRAM, as well as the starting virtual address for NVM and ending virtual address for NVM.

It is determined whether a packet is to be routed to memory (306). If a packet is not to be routed to memory, the example process 300 loops back. If a packet is to be routed to memory, it is determined whether the packet destination is the cache (308). For example, it is determined whether the packet destination is the $L_1$ cache, the $L_2$ cache, or the $L_3$ cache. If the packet destination is the cache, the packet is stored in the cache (310), and the example process 300 loops back. If the packet destination is not the cache, it is determined whether the packet destination is main memory (312). If the packet destination is not main memory, the packet data is stored in disk-based memory (314), and the example process 400 loops back. If the packet destination is main memory, the virtual address is determined from the packet (316). For example, and as described above, the virtual address is determined from the cache block metadata.

The virtual address is searched for in the pre-configured DRAM/NVM ranges (318). For example, the virtual address is compared to each of the DRAM range and the NVM range to determine whether the virtual address is included in the DRAM range, or the NVM range. It is determined whether the virtual address is within the DRAM range (320). If the virtual address is in the DRAM range, the packet is routed to DRAM (322), and the example process 300 loops back. If the virtual address is not in the DRAM range, the packet is routed to NVM (324), and the example process 300 loops back.

In some example, the example process 300 is continuously executed during execution of the application to route packets to the cache, DRAM, or NVM within the system simulator, as described herein.

Figure 4:
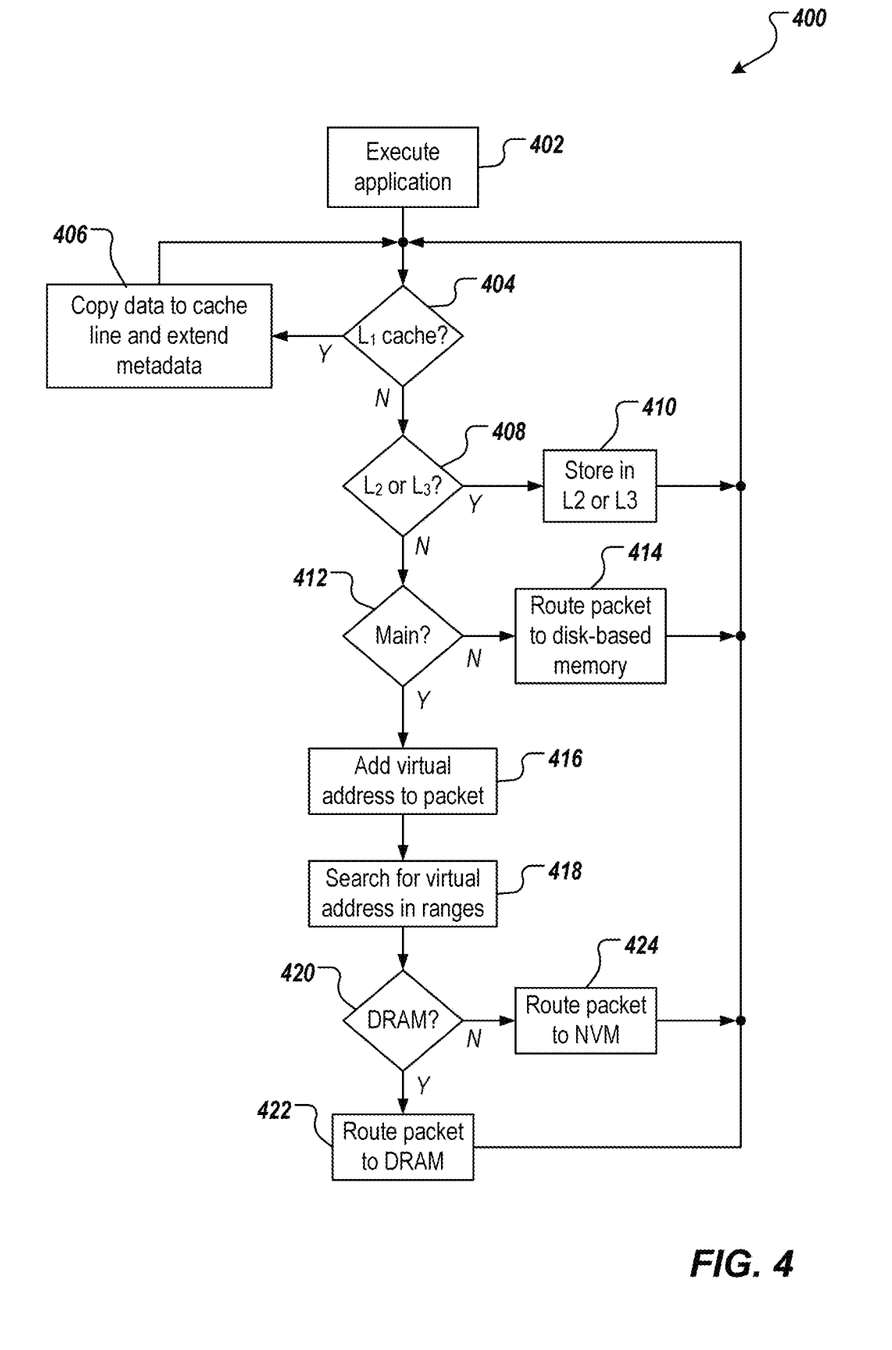
FIG. 4 depicts an example process that can be executed in accordance with implementations such as those of the present disclosure.

FIG. 4 depicts an example process 400 that can be executed in accordance with implementations of the present disclosure. In some implementations, the example process 400 may be performed using one or more computer-executable programs executed using one or more computing devices. The example process 400 of FIG. 4 can be performed to handle write packets in a system simulator (e.g., the system simulator 204 of FIG. 2).

In some examples, the example process 400 is performed during execution of the application (402), and after the system call configureVirtualRanges has been invoked, as described herein. It is determined whether the packet destination is the $L_1$ cache (404). If the packet destination is the $L_1$ cache, the packet data is copied to the cache line (406), during which the metadata of the cache line is extended to store the original virtual address of the packet, and the example process loops back. If the packet destination is not the $L_1$ cache, it is determined whether the packet destination is the $L_2$ cache or the $L_3$ cache (408). If the packet destination is the $L_2$ cache or the $L_3$ cache, the packet data is stored in the $L_2$ cache or the $L_3$ cache (410), and the example process 400 loops back.

If the packet destination is not the L2 cache or the L3 cache, it is determined whether the packet destination is main memory (412). If the packet destination is not main memory, the packet data is stored in disk-based memory (414), and the example process 400 loops back. If the packet destination is main memory, the virtual address is added to the packet, as the packet leaves the LLC (416). The virtual address is searched for in the pre-configured DRAM/NVM ranges (418). For example, the virtual address is compared to each of the DRAM range and the NVM range to determine whether the virtual address is included in the DRAM range, or the NVM range. It is determined whether the virtual address is within the DRAM range (420). If the virtual address is in the DRAM range, the packet is routed to DRAM (422), and the example process 400 loops back. If the virtual address is not in the DRAM range, the packet is routed to NVM (424), and the example process 400 loops back.

In some example, the example process 400 is continuously executed during execution of the application to route packets to the cache, DRAM, or NVM within the system simulator, as described herein.

Figure 5:
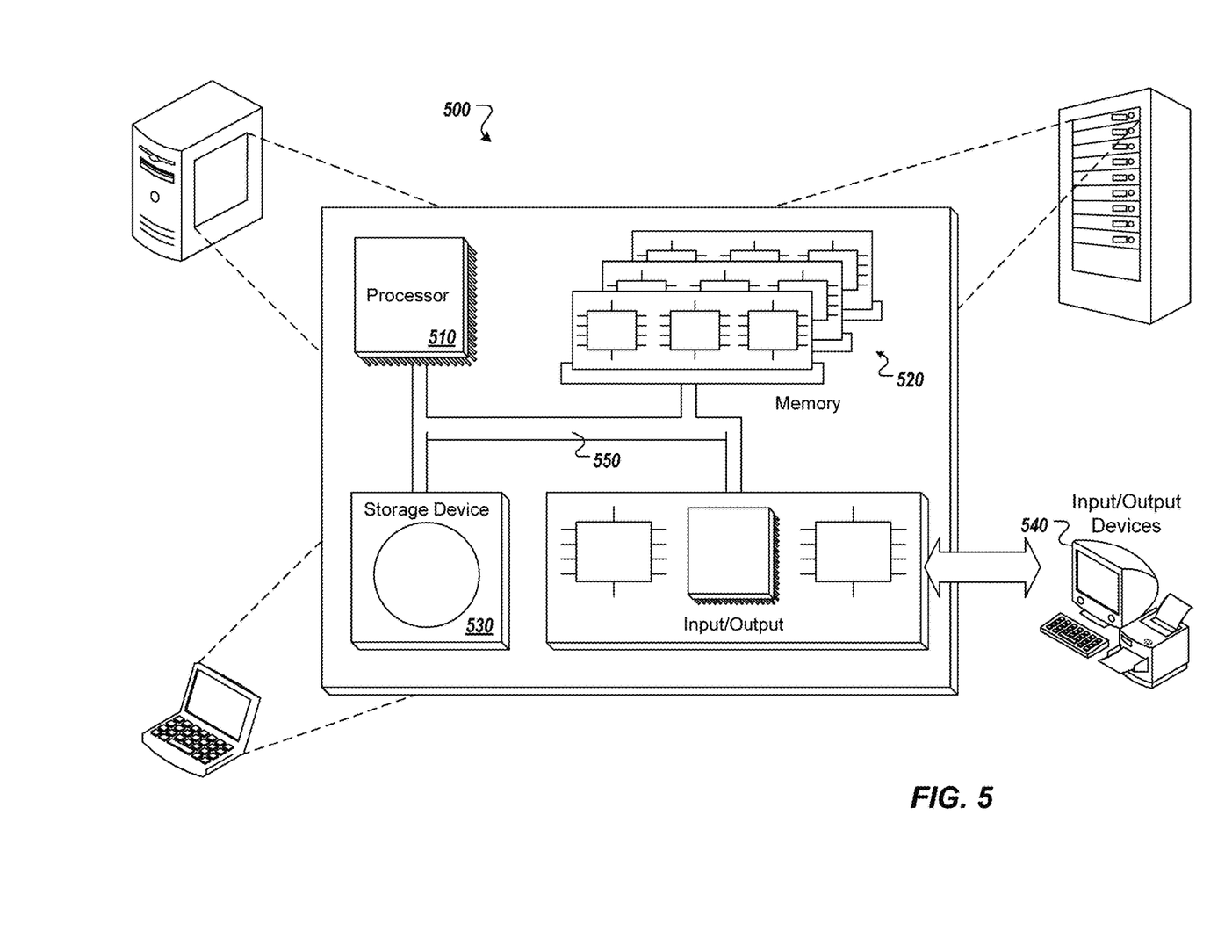
FIG. 5 is a schematic illustration of example computer systems that may be employed for implementations such as those of the present disclosure.

FIG. 5 depicts a schematic diagram of an example computing system 500. The system 500 may be used to perform the operations described with regard to one or more implementations of the present disclosure. For example, the system 500 may be included in any or all of the server components, or other computing device(s), discussed herein. The system 500 may include one or more processors 510, one or more memories 520, one or more storage devices 530, and one or more input/output (I/O) devices 540. The components 510, 520, 530, 540 may be interconnected using a system bus 550.

The processor 510 may be configured to execute instructions within the system 500. The processor 510 may include a single-threaded processor or a multi-threaded processor. The processor 510 may be configured to execute or otherwise process instructions stored in one or both of the memory 520 or the storage device 530. Execution of the instruction(s) may cause graphical information to be displayed or otherwise presented via a user interface on the I/O device 540. The processor(s) 510 may include the CPU 102.

The memory 520 may store information within the system 500. In some implementations, the memory 520 is a computer-readable medium. In some implementations, the memory 520 may include one or more volatile memory units. In some implementations, the memory 520 may include one or more non-volatile memory units. The memory 520 may include the hybrid main memory system 104.

The storage device 530 may be configured to provide mass storage for the system 500. In some implementations, the storage device 530 is a computer-readable medium. The storage device 530 may include a floppy disk device, a hard disk device, an optical disk device, a tape device, or other type of storage device. The I/O device 540 may provide I/O operations for the system 500. In some implementations, the I/O device 540 may include a keyboard, a pointing device, or other devices for data input. In some implementations, the I/O device 540 may include output devices such as a display unit for displaying graphical user interfaces or other types of user interfaces.

The features described may be implemented in digital electronic circuitry, or in computer hardware, firmware, software, or in combinations of them. The apparatus may be implemented in a computer program product tangibly embodied in an information carrier (e.g., in a machine-readable storage device) for execution by a programmable processor; and method steps may be performed by a programmable processor executing a program of instructions to perform functions of the described implementations by operating on input data and generating output. The described features may be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that may be used, directly or indirectly, in a computer to perform a certain activity or bring about a certain result. A computer program may be written in any form of programming language, including compiled or interpreted languages, and it may be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer may include a processor for executing instructions and one or more memories for storing instructions and data. Generally, a computer may also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory may be supplemented by, or incorporated in, application-specific integrated circuits (ASICs).

To provide for interaction with a user, the features may be implemented on a computer having a display device such as a cathode ray tube (CRT) or liquid crystal display (LCD) monitor for displaying information to the user and a keyboard and a pointing device such as a mouse or a trackball by which the user may provide input to the computer.

The features may be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system may be connected by any form or medium of digital data communication such as a communication network. Examples of communication networks include, e.g., a local area network (LAN), a wide area network (WAN), and the computers and networks forming the Internet.

The computer system may include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method executed by one or more processors, the method being executed during simulation of an application interacting with a hybrid memory system, and comprising:
    providing, by the one or more processors, a first range of virtual addresses corresponding to a first type of memory in the hybrid memory system, and a second range of virtual addresses corresponding to a second type of memory in the hybrid memory system;
    receiving, by a simulator that is executed by the one or more processors and interacts with the application during the simulation, a data packet that is to be stored in the hybrid memory system, the data packet being received from the application, the simulator being configured to operate in a full system mode and a system call emulation mode,
        wherein when executing in the full system mode, the simulator runs a full operating system, and when executing in the system call emulation mode, the simulator implements one or more system calls within simulator code of the simulator instead of a full operating system;
    storing, by the simulator, the data packet in a first level of a multi-level cache, the multi-level cache having a policy to writeback data from the first level to consecutive levels until the data packet reaches a last level of the multi-level cache;

determining, by the one or more processors, a virtual address assigned to the data packet, the virtual address being recorded in cache block metadata to preserve the virtual address while the data packet is stored in the multi-level cache, wherein the virtual address is recorded in the cache block metadata when the data packet is stored in the first cache level; and storing, by the one or more processors, the data packet into the hybrid memory system by writebacking the data packet from the last level of the multi-level cache into one of the first type of memory and the second type of memory in the hybrid memory system based on the virtual address, the first range of virtual addresses, and the second range of virtual addresses.

2. The method of claim 1, wherein the first range of virtual addresses and the second range of virtual addresses are provided through invocation of a system call that informs memory controllers of the starting virtual address ending virtual address for the first type of memory, and the starting virtual address and ending virtual address for the second type of memory.

3. The method of claim 2, wherein the system call is invoked at execution of the application.

4. The method of claim 1, wherein the virtual address is added to the data packet in response to the data packet exiting the last level of the multi-level cache.

5. The method of claim 1, wherein the first type of memory comprises dynamic random access memory (DRAM), and the second type of memory comprises non-volatile memory (NVM).

6. A non-transitory computer-readable storage medium coupled to one or more processors and having instructions stored thereon which, when executed by the one or more processors, cause the one or more processors to perform operations during simulation of an application interacting with a hybrid memory system, the operations comprising:

providing a first range of virtual addresses corresponding to a first type of memory in the hybrid memory system, and a second range of virtual addresses corresponding to a second type of memory in the hybrid memory system;

receiving, by a simulator that interacts with the application during the simulation, a data packet that is to be stored in the hybrid memory system, the data packet being received from the application, the simulator being configured to operate in a full system mode and a system call emulation mode, wherein when executing in the full system mode, the simulator runs a full operating system, and when executing in the system call emulation mode, the simulator implements one or more system calls within simulator code of the simulator instead of a full operating system;

storing the data packet in a first level of a multi-level cache, the multi-level cache having a policy to writeback data from the first level to consecutive levels until the data packet reaches a last level of the multi-level cache;

determining a virtual address assigned to the data packet, the virtual address being recorded in cache block metadata to preserve the virtual address while the data packet is stored in the multi-level cache, wherein the virtual address is recorded in the cache block metadata when the data packet is stored in the first cache level; and storing the data packet into the hybrid memory system by writebacking the data packet from the last level of the multi-level cache into one of the first type of memory and the second type of memory in the hybrid memory system based on the virtual address, the first range of virtual addresses, and the second range of virtual addresses.

7. The computer-readable storage medium of claim 6, wherein the first range of virtual addresses and the second range of virtual addresses are provided through invocation of a system call that informs memory controllers of the starting virtual address ending virtual address for the first type of memory, and the starting virtual address and ending virtual address for the second type of memory.

8. The computer-readable storage medium of claim 7, wherein the system call is invoked at execution of the application.

9. The computer-readable storage medium of claim 6, wherein the virtual address is added to the data packet in response to the data packet exiting the last level of the multi-level cache.

10. The computer-readable storage medium of claim 6, wherein the first type of memory comprises dynamic random access memory (DRAM), and the second type of memory comprises non-volatile memory (NVM).

11. A system, comprising:
a computing device; and
a computer-readable storage device coupled to the computing device and having instructions stored thereon which, when executed by the computing device, cause the computing device to perform operations during simulation of an application interacting with a hybrid memory system, the operations comprising:

providing a first range of virtual addresses corresponding to a first type of memory in the hybrid memory system, and a second range of virtual addresses corresponding to a second type of memory in the hybrid memory system;

receiving, by a simulator that is executed by the one or more processors and interacts with the application during the simulation, a data packet that is to be stored in the hybrid memory system, the data packet being received from the application, the simulator being configured to operate in a full system mode and a system call emulation mode, wherein when executing in the full system mode, the simulator runs a full operating system, and when executing in the system call emulation mode, the simulator implements one or more system calls within simulator code of the simulator instead of a full operating system;

storing the data packet in a first level of a multi-level cache, the multi-level cache having a policy to writeback data from the first level to consecutive levels until the data packet reaches a last level of the multi-level cache;

determining a virtual address assigned to the data packet, the virtual address being recorded in cache block metadata to preserve the virtual address while the data packet is stored in the multi-level cache, wherein the virtual address is recorded in the cache block metadata when the data packet is stored in the first cache level; and storing the data packet into the hybrid memory system by writebacking the data packet from the last level of the multi-level cache into one of the first type of memory and the second type of memory in the hybrid memory system based on the virtual address, the first range of virtual addresses, and the second range of virtual addresses.

12. The system of claim 11, wherein the first range of virtual addresses and the second range of virtual addresses are provided through invocation of a system call that informs memory controllers of the starting virtual address ending virtual address for the first type of memory, and the starting virtual address and ending virtual address for the second type of memory.

13. The system of claim 12, wherein the system call is invoked at execution of the application.

14. The system of claim 11, wherein the virtual address is added to the data packet in response to the data packet exiting the last level of the multi-level cache.

15. The method of claim 1, wherein the virtual address is assigned to the data packet in the application.

16. The computer-readable storage medium of claim 6, wherein the virtual address is assigned to the data packet in the application.

17. The system of claim 11, wherein the virtual address is assigned to the data packet in the application.

\* \* \* \* \*